United States Patent Office 2,831,241
Patented Apr. 22, 1958

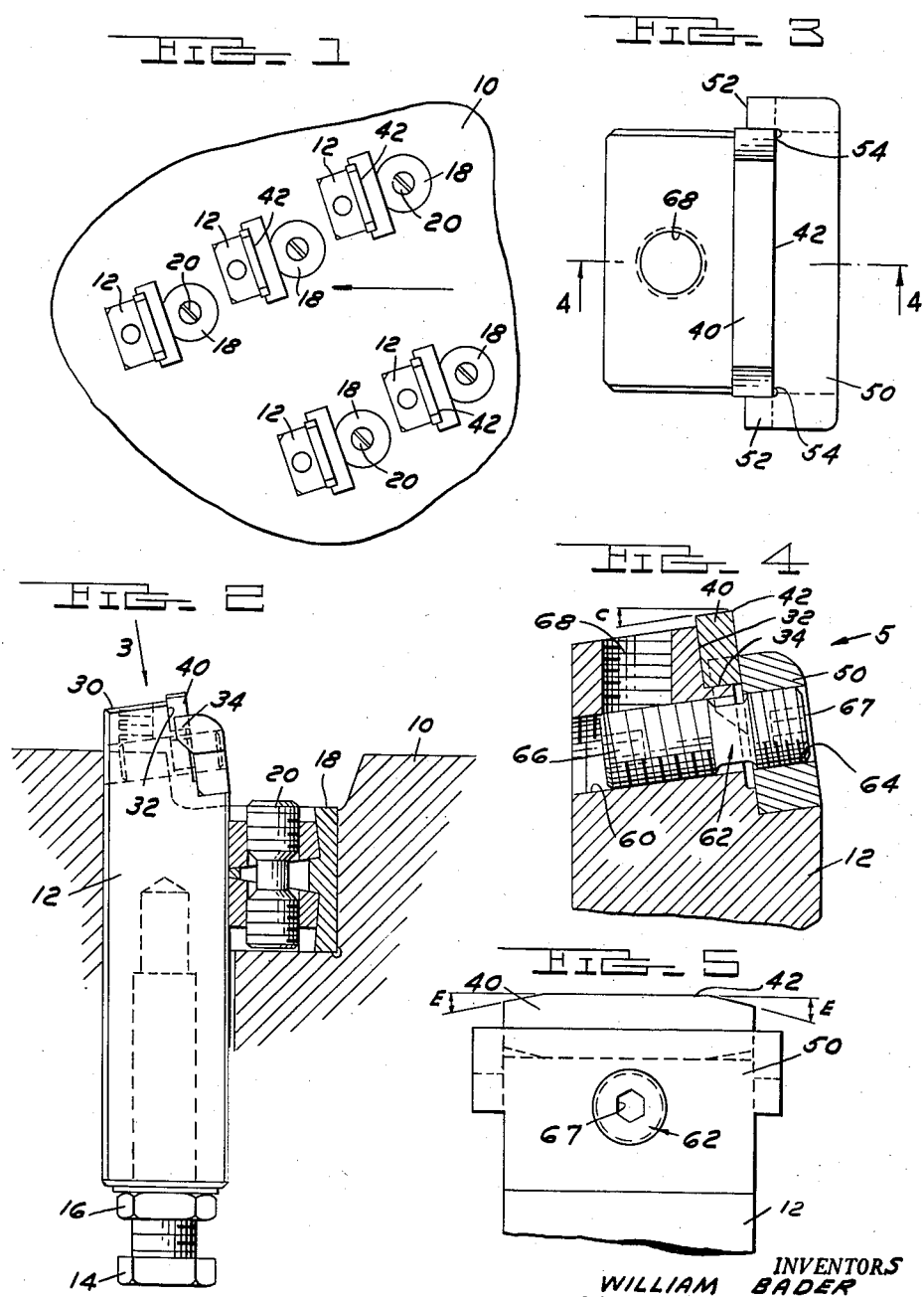

2,831,241

BROACH BLADE HOLDER

William Bader and Robert W. Berry, Jr., Ferndale, Mich., assignors to Wesson Tool Company, Ferndale, Mich., a corporation of Michigan Application August 3, 1955, Serial No. 526,227

1 Claim. (Cl. 29—95.1)

This invention relates to a broach tool and more particularly to that type of broach in which a number of inserts are held in a broach holder.

Reference is made to the patent to C. A. Hooper issued October 27, 1953 with No. 2,656,590. This patent discloses a broach holder for containing a multiplicity of elongate cutting tools having suitable cutting edges arranged in suitable spaced relation across the broach holder.

The particular type of cutting tools shown in the above Hooper patent were metal blocks with carbide inserts brazed to one edge and ground to a cutting angle.

It is an obpect here to disclose a holding device for carbide inserts which can be readily removed and replaced and indexed on each individual broach to the holder without removing the holder from the bed plate.

It is a further object of the disclosure to show a device for accomplishinging this holding of a carbide insert in a way which can be readily released by a one-hand operation of the operator and further one in which carbide inserts are properly designed to permit entry into the work without chattering or scuffing.

Other objects and features of the invention relating to details of construction and operation will be apparent in the following description and claim.

Drawings accompanying the disclosure, and the various views thereof may be briefly described as:

Figure 1, a plan view of an assembly of broach holders showing the manner in which they may be arranged in a holder bed or block.

Figure 2, a side elevation showing the individual holder element in position.

Figure 3, an angled end view as shown at the top of Figure 2.

Figure 4, a sectional view on line 4—4 of Figure 3.

Figure 5, a front plan view of the holder showing the approach angles of the cutter element.

Referring to the drawings, in Figure 1 there is shown a portion of a broach bed or block plate 10 in which there are arranged several broach holder members 12, each of which is an elongate bar as illustrated in Figure 2. The bar may have a seating regulator bolt 14 and lock nut 16 to regulate the depth of the insertion of the bar and the relationship of the top of the cutting edge to the face of the bed 10. The bars 12 may be locked in place by a double wedge lock 18 regulated by a screw 20 or by any other suitable locking means available.

The bar at the head end has an angled face 30 to provide clearance; and a portion of the bar at one corner, as viewed in Figure 2, is cut away to provide a recess.

The recess has an angled back wall 32 and an angled bottom surface 34 at right angles to the back wall. The bars 12 are usually inserted in a vertical direction, and the angle of the walls 32 and 34 is such that when a carbide insert 40 is placed against these walls in the recess formed thereby the insert will have a relationship to a horizontal plane which provides a clearance angle C as shown in Figure 4.

The insert 40 is substantially elongate in rectangular form with the exception that at each of the cutting edges the ends are angled as at E to provide entrance attack of the cutter as it moves into the work. The main cutting edge is shown at 42. The clamping means for the insert 40 consists of a bar 50 having two projecting lugs 52 at each end spaced to receive the carbide insert 40 and to project over the ends thereof, there being a slight relief groove 54 for the corners of the inserts 40. A threaded hole centrally of the bar 50 aligns with a threaded hole 60 in the bar 12, and in these holes is a differential screw 62 having a fine thread 64 at one end and a coarser thread 66 at the other end. A suitable Allen wrench recess 67 is provided in the screw 62 to permit manipulation thereof. In the top of bar 12 a threaded recess 68 is positioned for engagement with a pull rod to facilitate removal of the bars from a broach body.

In the operation of the device, it will be seen that the insert 40 is indexable four times so that the cutting edge may be replaced by a turning of the insert without regrinding. This may be accomplished by loosening the screw 62, which loosening action will move the locking bar 50 outward away from the bar 12 and away from the insert 40. Thus, the cutting insert may be indexed or replaced and upon tightening action it will be securely clamped into the recess against the walls 32 and 34.

The clearance angle C created by the inclination of the recess walls 32 and 34 is preferably around 7 degrees. The entrance angle E, shown in Figure 5, is preferably around 10 degrees.

As shown in Figure 1, the path of the work is at an angle to the general direction of the cutting edges 42; and it has been discovered that this clearance angle E is important to permit the broaches to enter the work effectively without being extreme pressure on the corner of the inserts 40 and causing breakage as well as galling and chattering. By angling the end surfaces of the inserts, as shown in Figure 5, a substantial distance back from the ends, preferably about 5/32 of an inch on an insert which is about an inch long, it has been found that the blade wear is materially increased and breakage is decreased in addition to providing a smooth entry of the cutters into the work as it passes the broach.

We claim:

A broach tooth carbide insert holder which comprises, a bar to be clamped to a broach body having one end to project above said body, said one end having a stepped recess formed of two spaced planes extending generally in the direction of the axis of the bar and two spaced planes extending generally transversely of the bar at right angles to the other spaced planes, said first planes being disposed at an angle to the forward and rear walls of the bar as it is disposed in the body, and an insert to be disposed in the uppermost of said recesses formed of a cutting material and dimensioned to position a cutting edge above said bar, a holding plate in the second of said recesses dimensioned to extend upwardly over a portion of said first recess to contact a lower portion of said insert and having means to position the ends of said insert on the side walls of said bar, and a differential screw means threaded into said bar and said plate wherein movement of the screw in one direction will move said plate toward said bar and said insert to a clamping position and movement of the screw in the other direction will cause said plate to move away from said bar and said insert, said insert being symmetrically formed so that it may be indexed to a plurality of positions in said first recess and having angled surfaces on opposed sides of the insert converging at the ends thereof.

References Cited in the file of this patent

UNITED STATES PATENTS

| | | |
|---|---|---|
| 2,096,472 | Schmidt | Oct. 19, 1937 |
| 2,330,081 | Phipps | Sept. 21, 1943 |
| 2,547,789 | Skeel | Apr. 3, 1951 |
| 2,567,167 | Drader | Sept. 11, 1951 |
| 2,664,617 | Kralowetz | Jan. 5, 1954 |
| 2,730,793 | Anthony et al. | Jan. 17, 1956 |